United States Patent
Bohnsack et al.

(10) Patent No.: US 12,380,078 B1
(45) Date of Patent: Aug. 5, 2025

(54) CALCULATED DICTIONARY COLUMN READERS

(71) Applicant: SAP SE, Walldorf (DE)

(72) Inventors: Nico Bohnsack, Ingersleben (DE); Andreas Amler, Heidelberg (DE); Paul Willems, Heidelberg (DE); Manuel Mayr, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/732,160

(22) Filed: Jun. 3, 2024

(51) Int. Cl.
*G06F 16/22* (2019.01)
*G06F 16/21* (2019.01)
*G06F 16/2455* (2019.01)

(52) U.S. Cl.
CPC .......... *G06F 16/221* (2019.01); *G06F 16/212* (2019.01); *G06F 16/2456* (2019.01)

(58) Field of Classification Search
CPC . G06F 16/221; G06F 16/2452; G06F 16/2456
USPC ........................................................ 707/693
See application file for complete search history.

(56) References Cited

U.S. PATENT DOCUMENTS

| | | | |
|---|---|---|---|
| 2010/0036862 A1* | 2/2010 | Das | G06F 16/86 707/698 |
| 2017/0116273 A1* | 4/2017 | Liu | G06F 16/81 |
| 2021/0081428 A1* | 3/2021 | Ravada | G06F 16/2452 |

* cited by examiner

*Primary Examiner* — Hung T Vy
(74) *Attorney, Agent, or Firm* — Mintz Levin Cohn Ferris Glovsky and Popeo, P.C.

(57) ABSTRACT

Arrangements for a reading scheme for column-oriented databases are provided. A virtual column may be generated by applying a structured query language operation on distinct values in a column of data in a table. Based on applying the structured query language operation, the virtual column may be populated with corresponding precalculated values. The virtual column may be compressed with dictionary-based compression. The compressing may include generating a column of value identifiers, each of the value identifiers representing a distinct value in the column of data. A database query against the compressed virtual column may be received. A result of the database query may be returned by retrieving one or more of the precalculated values from the compressed virtual column.

20 Claims, 5 Drawing Sheets

| Value ID | Internal Dictionary Values | LEFT(A, 2) |
|---|---|---|
| 0 | ABCD | AB |
| 1 | ABBCC | AB |
| 2 | ABGH | AB |
| 3 | BBBBB | BB |

CALCULATED DICTIONARY COLUMN READERS

TECHNICAL FIELD

The subject matter described herein relates generally to data processing and more specifically to calculated dictionary column readers.

BACKGROUND

Column-based storage is typically suitable for big tables with bulk updates. Oftentimes columnar operations may be required such that calculations are executed on individual columns. For example, values from a column may be read, and a formula may be applied on each row individually. Oftentimes when working with character data types in queries, a string function in structured query language (SQL) is implemented. Operations such as string operations may be expensive, inefficient, and time consuming especially when performed on a large scale.

SUMMARY

Methods, systems, and articles of manufacture, including computer program products, are provided for calculated dictionary column readers. In one aspect, there is provided a system including at least one processor and at least one memory. The at least one memory can store instructions that cause operations when executed by the at least one processor. The operations may include: generating a virtual column by applying a structured query language operation on distinct values in a column of data in a table; populating the virtual column with corresponding precalculated values based on applying the structured query language operation; compressing the virtual column with dictionary-based compression, the compressing comprising generating a column of value identifiers, each of the value identifiers representing a distinct value in the column of data; receiving a database query against the compressed virtual column; and returning a result of the database query by retrieving one or more of the precalculated values from the compressed virtual column.

In some variations, one or more of the features disclosed herein including the following features can optionally be included in any feasible combination. In some variations, the operations may further include applying, using the dictionary-based compression, further compression to the virtual column, the compression comprising combining duplicate column data and assigning a new value identifier to each distinct value in the further compressed virtual column.

In some variations, the structured query language operation may include a structured query language left function.

In some variations, the structured query language operation may be applied to more than one column.

In some variations, the database query may include a group by operation.

In some variations, the database query may include a join operation.

In some variations, the database query may include a set of benchmark queries.

In another aspect, there is provided a method for calculated dictionary column reader. The method may include: generating a virtual column by applying a structured query language operation on distinct values in a column of data in a table; populating the virtual column with corresponding precalculated values based on applying the structured query language operation; compressing the virtual column with dictionary-based compression, the compressing comprising generating a column of value identifiers, each of the value identifiers representing a distinct value in the column of data; receiving a database query against the compressed virtual column; and returning a result of the database query by retrieving one or more of the precalculated values from the compressed virtual column.

In some variations, one or more of the features disclosed herein including the following features can optionally be included in any feasible combination. In some variations, the method may further include applying, using the dictionary-based compression, further compression to the virtual column, the compression comprising combining duplicate column data and assigning a new value identifier to each distinct value in the further compressed virtual column.

In some variations, the structured query language operation may include a structured query language left function.

In some variations, the structured query language operation may be applied to more than one column.

In some variations, the database query may include a group by operation.

In some variations, the database query may include a set of benchmark queries.

In another aspect, there is provided a computer program product that includes a non-transitory computer readable medium. The non-transitory computer readable medium may store instructions that cause operations when executed by at least one processor. The operations may include: generating a virtual column by applying a structured query language operation on distinct values in a column of data in a table; populating the virtual column with corresponding precalculated values based on applying the structured query language operation; compressing the virtual column with dictionary-based compression, the compressing comprising generating a column of value identifiers, each of the value identifiers representing a distinct value in the column of data; receiving a database query against the compressed virtual column; and returning a result of the database query by retrieving one or more of the precalculated values from the compressed virtual column.

In some variations, one or more of the features disclosed herein including the following features can optionally be included in any feasible combination. In some variations, the operations may further include applying, using the dictionary-based compression, further compression to the virtual column, the compression comprising combining duplicate column data and assigning a new value identifier to each distinct value in the further compressed virtual column.

In some variations, the structured query language operation may include a structured query language left function.

In some variations, the structured query language operation may be applied to more than one column.

In some variations, the database query may include a group by operation.

In some variations, the database query may include a set of benchmark queries.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Aspects of the disclosure provide a technical solution that addresses problems associated with column lookups of a column-oriented database. Additional aspects of the disclosure implement different readers which make use of calculated dictionary column data to provide a virtual column to a framework which handles all needed mappings internally or "under the hood." Further aspects of the disclosure make use of optimization without the need for changes in the implementations of existing operators. Aspects of the disclosure are easily extensible and scalable. These and various other arrangements will be discussed more fully below.

Figure 1:
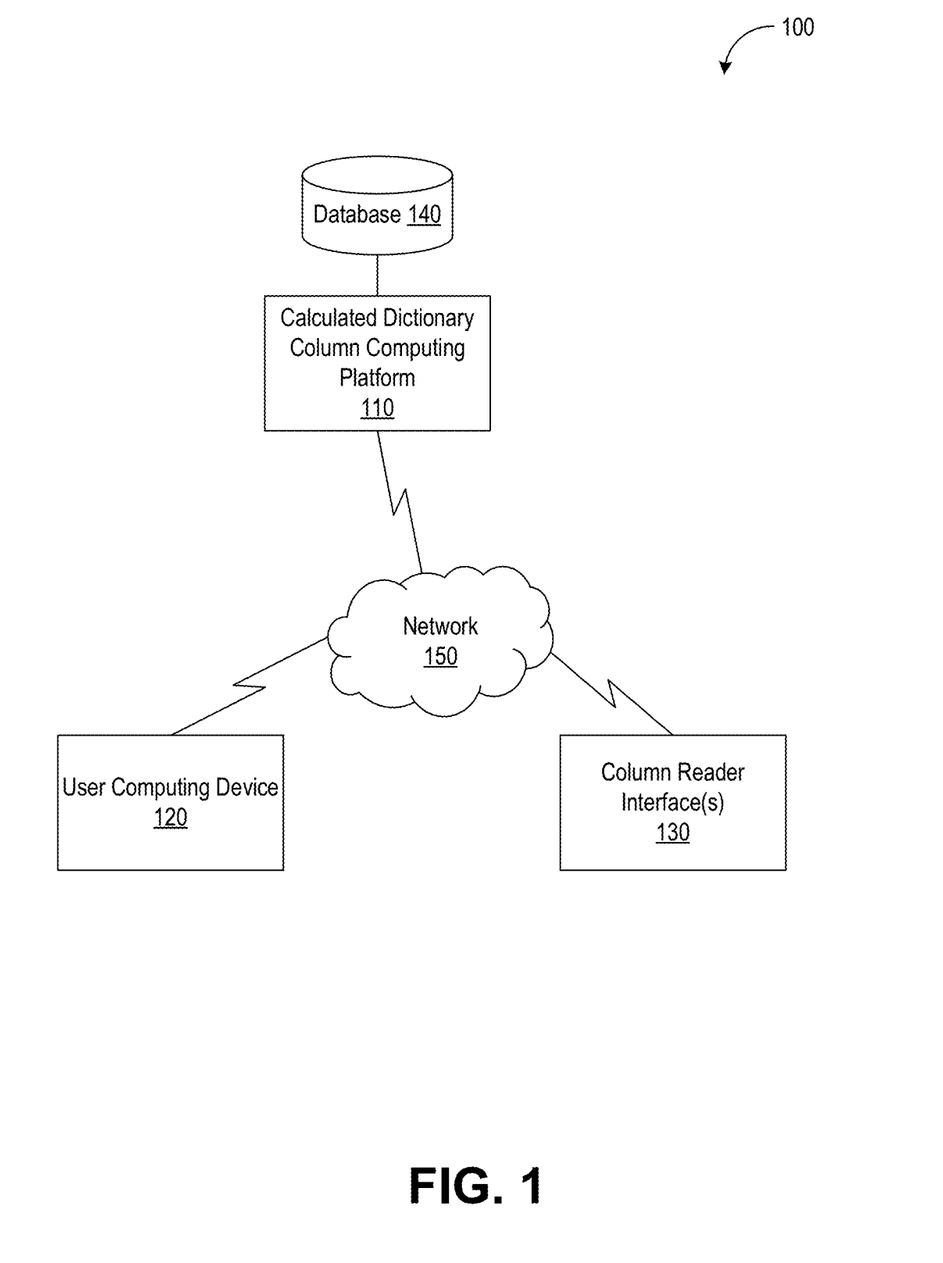
FIG. 1 depicts an illustrative computing environment for calculated dictionary column reader in accordance with some example embodiments.

FIG. 1 depicts an illustrative computing environment 100 for calculated dictionary column reader in accordance with some example embodiments. Referring to FIG. 1, the computing environment 100 may include one or more computing devices and/or other computing systems. For example, computing environment 100 may include an calculated dictionary column computing platform 110, a user computing device 120, column readers 130, and a database 140. Calculated dictionary column computing platform 110 may include one or more computing devices configured to perform one or more of the functions described herein. As discussed in further detail below, applicable formulas on one or more input columns may be replaced during plan generation with artificial fields, and corresponding mappings may be created. Different reader interfaces may efficiently utilize and practically apply the mappings in numerous different scenarios. Calculated dictionary column computing platform 110 may include an execution engine (e.g., a column engine), which may implement of one or more column reader interfaces 130 (also referred to herein as "column readers" or "column lookup readers") to read data from a column. The one or more column reader interfaces 130 may perform various different column lookup operations on a table column, as discussed in further detail below. User computing device 120 may be a processor-based device including, for example, a smartphone, a tablet computer, a wearable apparatus, a virtual assistant, an Internet-of-Things (IoT) appliance, and/or the like. User computing device 120 may generate queries using a structured query language (SQL).

Database 140 may include, for example, a relational database, an in-memory database, a graph database, a key-value store, a document store, and/or the like. In some examples, the calculated dictionary column computing platform 110 may maintain (e.g., store) various types of data, including static and nonstatic data (e.g., system data, customizing data, master data, application data, log data, and/or the like) in one or more database tables at a database 150 coupled with the calculated dictionary column computing platform 110.

Referring again to FIG. 1, the calculated dictionary column computing platform 110, the user computing device 120, the column reader(s) 130, and the database 140 may be communicatively coupled via a network 150. The network 150 may be a wired and/or wireless network including, for example, a wide area network (WAN), local area network (LAN), a virtual local area network (VLAN), the Internet, and/or the like.

Figure 2:
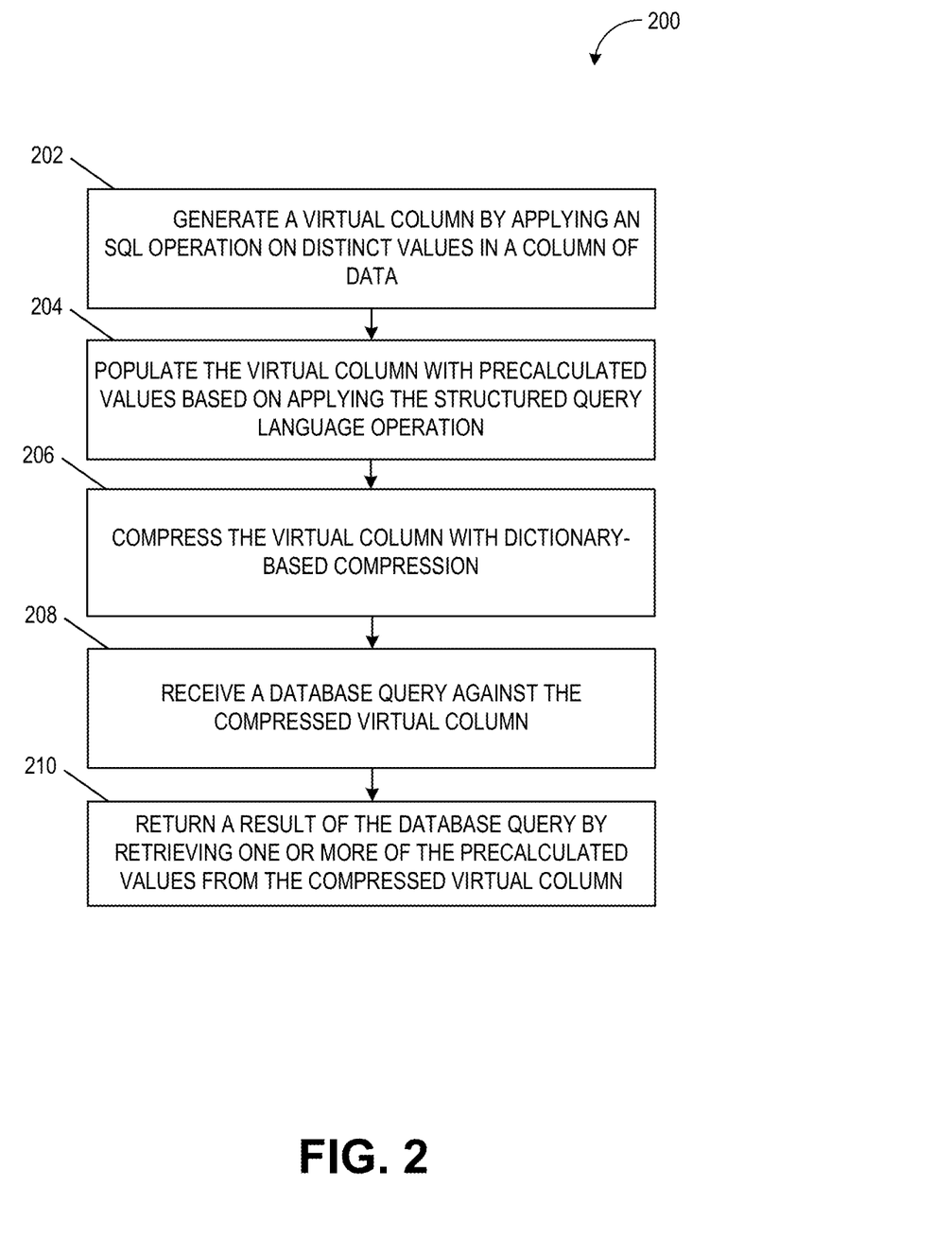
FIG. 2 depicts a flowchart illustrating a process for calculated dictionary column reader in accordance with some example embodiments.
Figure 3:
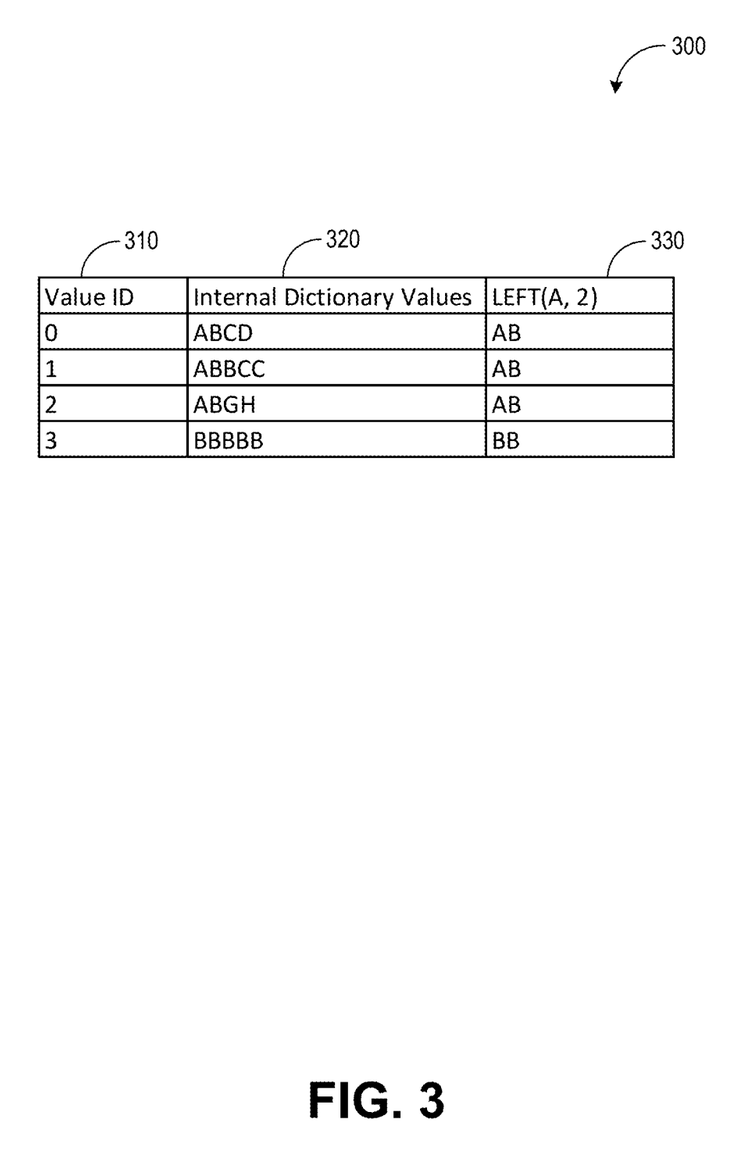
FIG. 3 depicts a calculated dictionary column in accordance with some example embodiments.
Figure 4:
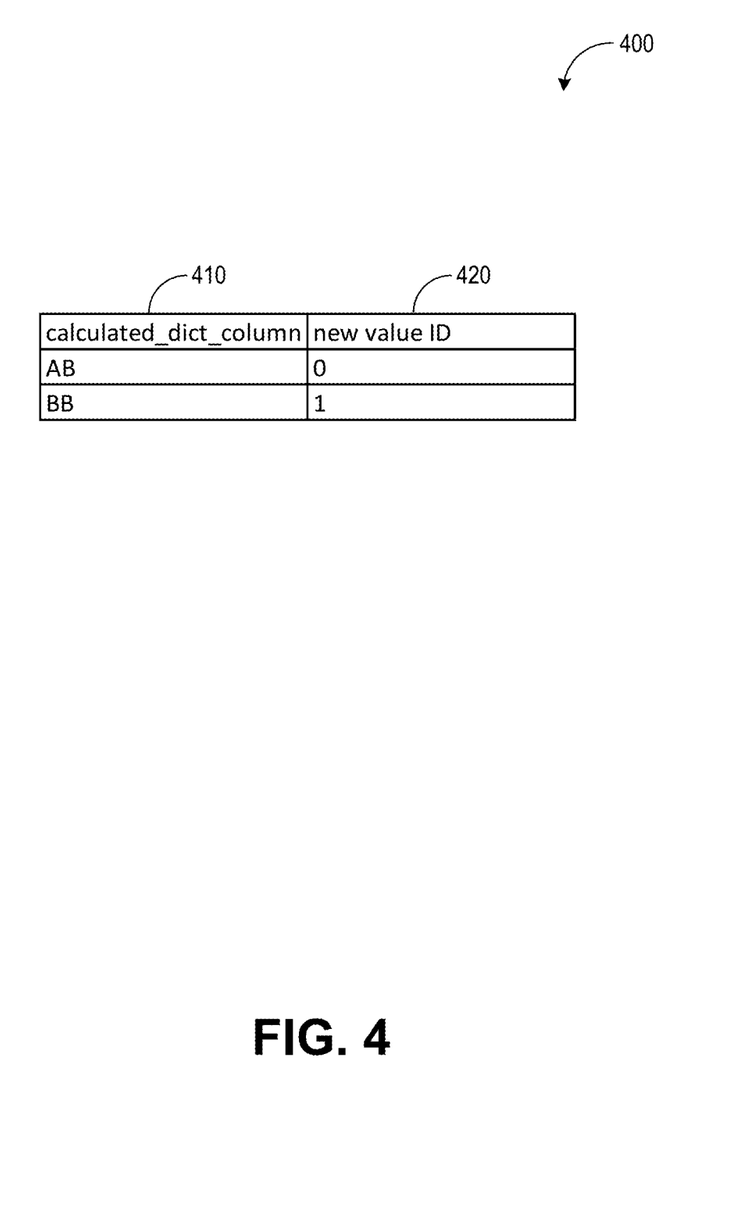
FIG. 4 depicts a calculated dictionary column in accordance with some example embodiments.

FIGS. 2-4 will be discussed together. FIG. 2 depicts a flowchart 200 illustrating a process for calculated dictionary column reader, in accordance with some example embodiments. FIG. 3 depicts a table 300 illustrating a calculated dictionary column in accordance with some example embodiments. FIG. 4 depicts a table 400 illustrating a calculated dictionary column in accordance with further example embodiments.

Referring to FIG. 2, at step 202, calculated dictionary column computing platform 110 may generate (e.g., via a column engine), a virtual column by applying a structured query language (SQL) operation on distinct values in a column of data in a table. The structured query language operation may include a left function (e.g., SQL LEFT( ). For example, LEFT(string, number_of_chars) indicates a string to extract from and a number of characters to extract (starting from the left). For instance, LEFT(A, 2) would extract and return the two leftmost characters of column "A" in a table. In some implementations, the structured query language operation may be applied to more than one column. For example, a calculated dictionary column may be and/or include a new column in a database table that is the result of a calculation based on one or more columns of the same table.

Virtual columns are columns that can be added subsequently to a table. The values of the virtual column are calculated based on the formula specified. The formula can include the values of one or more columns of the respective table. Virtual columns are columns that can be added subsequently to the table. The values of the virtual column are calculated based on the formula specified. The formula can include the values of one or more columns of the respective table. Data of the virtual column may include temporary data (e.g., existing only during execution of a query) or persistent data. In some implementations, the virtual column may be cached in memory or a buffer. In other implementations, the virtual column may be persisted on a storage device.

At step 204, calculated dictionary column computing platform 110 may populate the virtual column with corresponding precalculated values based on applying the structured query language operation.

At step 206, calculated dictionary column computing platform 110 may compress the virtual column with dictionary-based compression. For example, a column of value identifiers 310 (also referred to herein as "value IDs") may be generated, each of the value identifiers at 310 represents a distinct value in the column of data.

An example implementation is illustrated in FIG. 3. In FIG. 3, a virtual column 330 may be generated by applying a LEFT(A, 2) operation on distinct values 320 (i.e., internal dictionary values) in a column of data in a database table. The virtual column 330 may be populated with corresponding precalculated values {AB, AB, AB, BB} by applying the LEFT(A, 2) operation on the distinct values {ABCD, ABBCC, ABGH, BBBBB}. That is, column 330 contains the computed values with formula LEFT(A, 2) applied. A value identifier 310 for a value in a dictionary corresponds to the row number of the value's entry in the dictionary.

Returning to FIG. 2, at step 208, calculated dictionary column computing platform 110 may receive (e.g., via user computing device 120) a database query against the compressed virtual column. In some examples, the database query may include a group by operation (e.g., SQL GROUP BY) or a join operation (e.g., SQL JOIN). In some examples, the database query may include a set of benchmark queries (e.g., a decision support benchmark such as TPC-H).

A database query may include, for example: "SELECT LEFT(A, 2), COUNT(*) FROM TAB GROUP BY LEFT(A, 2)." A GROUP BY operator may specify the expressions on which to perform an aggregation operation (e.g., combining one or more input rows into a single row of output). In one example, GROUP BY may combine groups of rows that have the same content in the columns (e.g., col1, col2, etc.) and that have the same result in the SQL expressions (sql_exp1, sql_exp2, etc.) as a single row in the results set of a query.

In some examples, calculated dictionary column computing platform 110 may traverse or scan the distinct values of the column. For each distinct value, calculated dictionary column computing platform 110 may directly calculate the formula (e.g., LEFT (A, 2)). Notably, the calculation is only performed on the unique values/rows, rather than on every row. Thereby, an output may be produced without directly calculating the LEFT( ) operation each time. Query execution efficiency is improved.

In some examples, at step 210, calculated dictionary column computing platform 110 may return a result of the database query by retrieving one or more of the precalculated values from the compressed virtual column. In this regard, calculated dictionary column computing platform 110 may utilize a column reader interface 130 to perform various different column lookup operations on a table column. For example, referring to FIG. 3, a column reader may get a value at a given row position (e.g., getValueAtPos(0) for table 300 would directly return the value "AB" as if the LEFT(A, 2) is computed on the fly). An operator (e.g., a GROUP BY operator) may directly retrieve the precalculated value "AB" from the virtual column 330. In another example, a column reader may get a value ID at a given row position (e.g., a first position) of a table (e.g., for table 300, would return the value "0").

Additionally, or alternatively, in some implementations, calculated dictionary column computing platform 110 may apply, using the dictionary-based compression, further compression to the virtual column. For example, the compression may include combining duplicate column data and assigning a new value identifier to each distinct value in the further compressed virtual column.

As shown in FIG. 3, for example, a column 310 might have multiple value IDs {0, 1, 2} which all represent the same value (e.g., "AB"). This may prevent use of value ID-based algorithms since a value ID is not a unique identifier. Therefore, referring to FIG. 4, in some implementations, further compression may be performed to generate a dictionary (e.g., table 400) with unique or distinct values (e.g., "AB" and "BB"). As illustrated in FIG. 4, table 400 includes uniquely calculated values {AB, BB} at 410 and the row number corresponds to the new value identifiers {0, 1} at 420. This further compression allows use of value ID-based algorithms (e.g., directly grouping by unique value IDs, joining them, etc.) that can improve runtime.

Advantageously, calculated dictionary column computing platform 110 may implement column readers, which use the calculated mappings at 300, 400 to perform the calculation (e.g., LEFT(A, 2)) in a performant way. In addition, such calculated mappings may be used for any operator that is part of a query. For example, the column reader implementation discussed herein supports the SQL YEAR( ) function to extract a year out of date, SQL GROUP BYO to group by year, and/or other functions such as JOIN( ), ORDER BY( ), and/or the like.

Taking again the example query discussed above (SELECT LEFT(A, 2), COUNT(*) FROM TAB GROUP BY LEFT(A, 2)), a traditional reading scheme may read values from column "A", the formula LEFT(A, 2) may be applied per row, then the grouping and calculation of the COUNT(*) using the applicable algorithm (e.g., hash GROUP BY algorithm) may be performed. In contrast, with respect to the same example query, the column reader implementation discussed herein may allow for the GROUP BY operator to utilize mappings in tables 300 or 400 to avoid calculation of the formula LEFT (A, 2) per row, thereby speeding up query computation. This advantage is achieved without the need to change the implementation of the GROUP BY operator.

Figure 5:
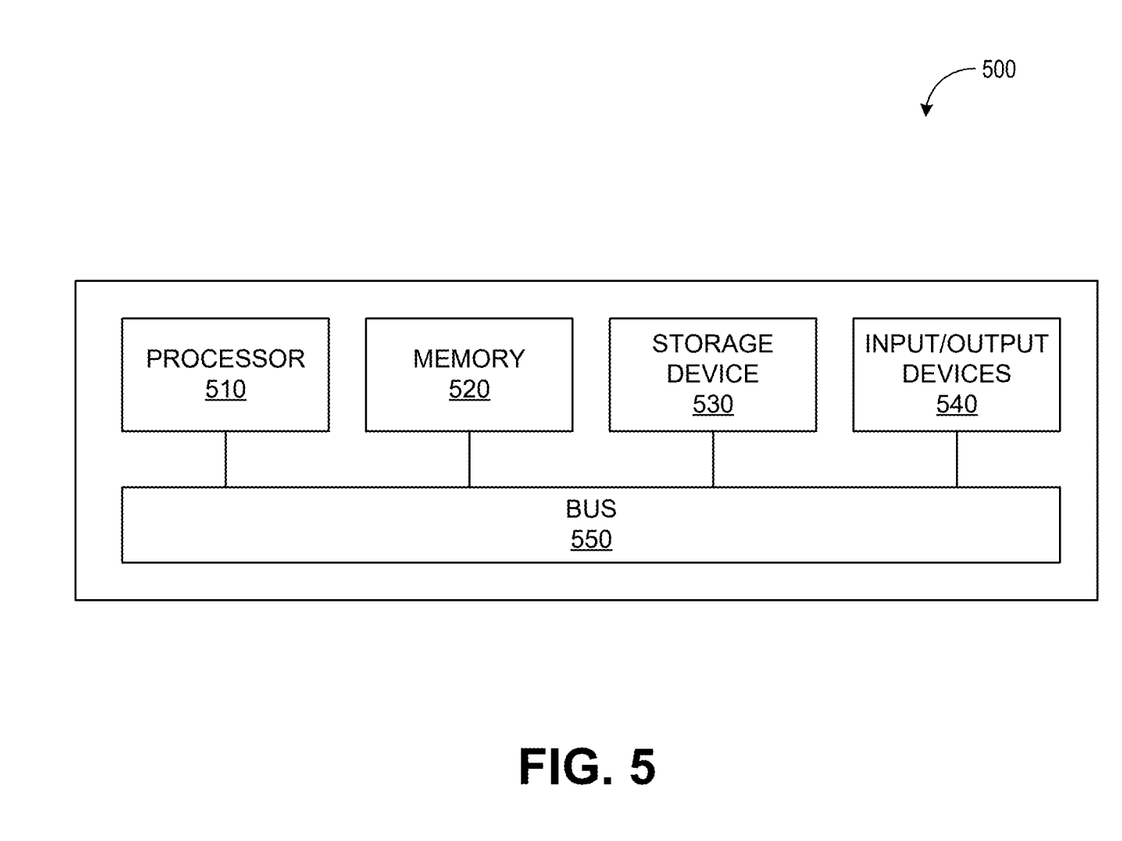
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1-5, the computing system 500 can be used to implement the calculated dictionary column computing platform 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 410 is capable of processing instructions for execution within the computing system 500. Such executed instructions can implement one or more components of, for example, the calculated dictionary column computing platform 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid-state device, a floppy disk device, a hard disk device, an optical disk device, a tape device, and/or any other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
 at least one processor; and
 at least one memory storing instructions, which when executed by the at least one processor, result in operations comprising:
  generating a virtual column by applying a structured query language operation on distinct values in a column of data in a table;
  populating the virtual column with corresponding precalculated values based on applying the structured query language operation;
  compressing the virtual column with dictionary-based compression, the compressing comprising generating a column of value identifiers, each of the value identifiers representing a distinct value in the column of data;
  receiving a database query against the compressed virtual column; and
  returning a result of the database query by retrieving one or more of the precalculated values from the compressed virtual column.

Example 2: The system of Example 1, further comprising: applying, using the dictionary-based compression, further compression to the virtual column, the compression comprising combining duplicate column data and assigning a new value identifier to each distinct value in the further compressed virtual column.

Example 3: The system of any of Examples 1-2, wherein the structured query language operation comprises a structured query language left function.

Example 4: The system of any of Examples 1-3, wherein the structured query language operation is applied to more than one column.

Example 5: The system of any of Examples 1-4, wherein the database query comprises a group by operation.

Example 6: The system of any of Examples 1-5, wherein the database query comprises a join operation.

Example 7: The system of any of Examples 1-6, wherein the database query comprises a set of benchmark queries.

Example 8: A computer-implemented method comprising:
 generating a virtual column by applying a structured query language operation on distinct values in a column of data in a table;
 populating the virtual column with corresponding precalculated values based on applying the structured query language operation;
 compressing the virtual column with dictionary-based compression, the compressing comprising generating a column of value identifiers, each of the value identifiers representing a distinct value in the column of data;
 receiving a database query against the compressed virtual column; and
 returning a result of the database query by retrieving one or more of the precalculated values from the compressed virtual column.

Example 9: The computer-implemented method of Example 8, further comprising: applying, using the dictionary-based compression, further compression to the virtual column, the compression comprising combining duplicate column data and assigning a new value identifier to each distinct value in the further compressed virtual column.

Example 10: The computer-implemented method of any of Examples 8-9, wherein the structured query language operation comprises a structured query language left function.

Example 11: The computer-implemented method of any of Examples 8-10, wherein the structured query language operation is applied to more than one column.

Example 12: The computer-implemented method of any of Examples 8-11, wherein the database query comprises a group by operation.

Example 13: The computer-implemented method of any of Examples 8-12, wherein the database query comprises a join operation.

Example 14: The computer-implemented method of any of Examples 8-13, wherein the database query comprises a set of benchmark queries.

Example 15: A non-transitory computer-readable medium storing instructions, which when executed by at least one processor, result in operations comprising:
generating a virtual column by applying a structured query language operation on distinct values in a column of data in a table;
populating the virtual column with corresponding precalculated values based on applying the structured query language operation;
compressing the virtual column with dictionary-based compression, the compressing comprising generating a column of value identifiers, each of the value identifiers representing a distinct value in the column of data;
receiving a database query against the compressed virtual column; and
returning a result of the database query by retrieving one or more of the precalculated values from the compressed virtual column.

Example 16: The non-transitory computer-readable medium of Example 15, further comprising: applying, using the dictionary-based compression, further compression to the virtual column, the compression comprising combining duplicate column data and assigning a new value identifier to each distinct value in the further compressed virtual column.

Example 17: The non-transitory computer-readable medium any of Examples 15-16, wherein the structured query language operation comprises a structured query language left function.

Example 18: The non-transitory computer-readable medium any of Examples 15-17, wherein the structured query language operation is applied to more than one column.

Example 19: The non-transitory computer-readable medium any of Examples 15-18, wherein the database query comprises a group by operation.

Example 20: The non-transitory computer-readable medium any of Examples 15-19, wherein the database query comprises a set of benchmark queries.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:
1. A system, comprising:
at least one processor; and
at least one memory storing instructions, which when executed by the at least one processor, result in operations comprising:
generating a virtual column by applying a structured query language operation on distinct values in a column of data in a table;

populating the virtual column with corresponding precalculated values based on applying the structured query language operation;

compressing the virtual column with dictionary-based compression, the compressing comprising generating a column of value identifiers, each of the value identifiers representing a distinct value in the column of data;

receiving a database query against the compressed virtual column; and returning a result of the database query by retrieving one or more of the precalculated values from the compressed virtual column.

2. The system of claim 1, further comprising:

applying, using the dictionary-based compression, further compression to the virtual column, the compression comprising combining duplicate column data and assigning a new value identifier to each distinct value in the further compressed virtual column.

3. The system of claim 1, wherein the structured query language operation comprises a structured query language left function.

4. The system of claim 1, wherein the structured query language operation is applied to more than one column.

5. The system of claim 1, wherein the database query comprises a group by operation.

6. The system of claim 1, wherein the database query comprises a join operation.

7. The system of claim 1, wherein the database query comprises a set of benchmark queries.

8. A computer-implemented method comprising:

generating a virtual column by applying a structured query language operation on distinct values in a column of data in a table;

populating the virtual column with corresponding precalculated values based on applying the structured query language operation;

compressing the virtual column with dictionary-based compression, the compressing comprising generating a column of value identifiers, each of the value identifiers representing a distinct value in the column of data;

receiving a database query against the compressed virtual column; and returning a result of the database query by retrieving one or more of the precalculated values from the compressed virtual column.

9. The computer-implemented method of claim 8, further comprising:

applying, using the dictionary-based compression, further compression to the virtual column, the compression comprising combining duplicate column data and assigning a new value identifier to each distinct value in the further compressed virtual column.

10. The computer-implemented method of claim 8, wherein the structured query language operation comprises a structured query language left function.

11. The computer-implemented method of claim 8, wherein the structured query language operation is applied to more than one column.

12. The computer-implemented method of claim 8, wherein the database query comprises a group by operation.

13. The computer-implemented method of claim 8, wherein the database query comprises a join operation.

14. The computer-implemented method of claim 8, wherein the database query comprises a set of benchmark queries.

15. A non-transitory computer readable medium storing instructions, which when executed by at least one processor, result in operations comprising:

generating a virtual column by applying a structured query language operation on distinct values in a column of data in a table;

populating the virtual column with corresponding precalculated values based on applying the structured query language operation;

compressing the virtual column with dictionary-based compression, the compressing comprising generating a column of value identifiers, each of the value identifiers representing a distinct value in the column of data;

receiving a database query against the compressed virtual column; and returning a result of the database query by retrieving one or more of the precalculated values from the compressed virtual column.

16. The non-transitory computer readable medium of claim 15, further comprising:

applying, using the dictionary-based compression, further compression to the virtual column, the compression comprising combining duplicate column data and assigning a new value identifier to each distinct value in the further compressed virtual column.

17. The non-transitory computer readable medium of claim 15, wherein the structured query language operation comprises a structured query language left function.

18. The non-transitory computer readable medium of claim 15, wherein the structured query language operation is applied to more than one column.

19. The non-transitory computer readable medium of claim 15, wherein the database query comprises a group by operation.

20. The non-transitory computer readable medium of claim 15, wherein the database query comprises a set of benchmark queries.

* * * * *